US007858172B2

(12) United States Patent
Imaizumi et al.

(10) Patent No.: US 7,858,172 B2
(45) Date of Patent: Dec. 28, 2010

(54) FIBER-REINFORCED THERMOPLASTIC RESIN MOLDED ARTICLE

(75) Inventors: Hiroyuki Imaizumi, Kanagawa (JP); Yasushi Yamanaka, Kanagawa (JP); Kei Morimoto, Kanagawa (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 12/302,257

(22) PCT Filed: May 24, 2007

(86) PCT No.: PCT/JP2007/060576

§ 371 (c)(1),
(2), (4) Date: Sep. 28, 2009

(87) PCT Pub. No.: WO2007/138966

PCT Pub. Date: Dec. 6, 2007

(65) Prior Publication Data

US 2010/0009158 A1    Jan. 14, 2010

(30) Foreign Application Priority Data

May 25, 2006  (JP)  ............................. 2006-144738
Jun. 15, 2006  (JP)  ............................. 2006-165475
Sep. 15, 2006  (JP)  ............................. 2006-251019

(51) Int. Cl.
*B32B 27/04* (2006.01)

(52) U.S. Cl. ................. 428/297.4; 428/299.4; 264/134; 264/143; 264/211

(58) Field of Classification Search .............. 428/297.4, 428/299.4, 293.4; 524/100; 264/134, 143, 264/211, 328.18
See application file for complete search history.

(56) References Cited

U.S. PATENT DOCUMENTS

| 5,679,456 | A | 10/1997 | Sakai et al. | |
|---|---|---|---|---|
| 5,824,410 | A | 10/1998 | Sakai et al. | |
| 6,060,010 | A | 5/2000 | Sakai et al. | |
| 6,428,728 | B1 | 8/2002 | Sakai et al. | |
| 6,562,179 | B1 * | 5/2003 | Ikeguchi et al. | 156/307.5 |
| 6,855,755 | B1 * | 2/2005 | Morimoto et al. | 524/106 |
| 7,465,481 | B2 * | 12/2008 | Imaizumi et al. | 428/34.5 |
| 2008/0167415 | A1 * | 7/2008 | Stoeppelmann et al. | 524/494 |
| 2010/0009158 | A1 * | 1/2010 | Imaizumi et al. | 428/222 |
| 2010/0159175 | A1 * | 6/2010 | Stoeppelmann et al. | 428/36.9 |
| 2010/0168289 | A1 * | 7/2010 | Ding et al. | 524/100 |

FOREIGN PATENT DOCUMENTS

| CN | 1109405 | A | 10/1995 |
|---|---|---|---|
| JP | 2-60494 | A | 2/1990 |
| JP | 5-9380 | A | 1/1993 |
| JP | 6-107944 | A | 4/1994 |
| JP | 9-286036 | A | 11/1997 |
| JP | 2005-349697 | A | 12/2005 |
| JP | 2006-45390 | A | 2/2006 |
| JP | 2006-82275 | A | 3/2006 |

OTHER PUBLICATIONS

Chinese Office Action dated Aug. 19, 2010 which issued in Chinese Application No. 200780019149.2.

* cited by examiner

*Primary Examiner*—N. Edwards
(74) *Attorney, Agent, or Firm*—Birch, Stewart, Kolasch & Birch, LLP

(57) ABSTRACT

Provided is a fiber-reinforced thermoplastic resin molded article, which contains reinforcing fibers having a given flattened cross-sectional profile, in which the fiber length distribution of the reinforcing fibers is shifted on the side of long fibers, and which is excellent in mechanical strength, heat resistance, dimensional accuracy such as warpage resistance, and surface appearance.

9 Claims, No Drawings

FIBER-REINFORCED THERMOPLASTIC RESIN MOLDED ARTICLE

TECHNICAL FIELD

The present invention relates to a fiber-reinforced thermoplastic resin molded article, and more precisely, to a fiber-reinforced thermoplastic resin molded article excellent in mechanical strength, heat resistance, warpage resistance and surface appearance, which contains reinforcing fibers having a flattened cross-sectional profile and in which the fiber length distribution of the reinforcing fibers is shifted on the side of long fibers.

BACKGROUND ART

A thermoplastic resin molded article containing reinforcing fibers such as typically glass fibers or carbon fibers is excellent in mechanical strength, heat resistance and chemical resistance, and is utilized as parts in the field of automobiles, in the field of electric and electronic appliances and in the field of precision machines. However, with the recent requirement for weight reduction thereof, such parts are much down-sized and thinned, and are further required to have increased mechanical strength and dimensional stability; and at the same time, for the molding materials to be used for them, it is required to develop materials capable of satisfying the above-mentioned necessary properties. In particular, in the field of automobiles, the parts to be used in the engine room are required to have sufficient mechanical strength even at high temperatures of 100° C. or more, and resin materials have come to be used for the exterior panels and the structural components for supporting them.

Regarding the reinforcing fiber length in molded articles, it has been known for a long time that the mechanical strength such as rigidity and impact resistance of the articles can be enhanced by prolonging the fiber length. For example, Patent Reference 1 discloses a long fiber-reinforced polyamide resin composition and a molded article produced by injection-molding the resin composition, which are excellent in mechanical strength and moldability and which comprises (A) a polyamide resin, (B) a fibrous reinforcing material having a length of at least 3 mm in an amount of from 5 to 80% by weight (of the composition), and (C) a fatty acid metal salt having from 22 to 32 carbon atoms in an amount of from 0.01 to 3% by weight (of the composition). Patent Reference 2 discloses a resin composition and a molded article produced by injection-molding the resin composition which have a good surface appearance and have a high thermal deformation temperature, and contain a blend of nylon-66/nylon 6=(99 to 1% by weight)/(1 to 99% by weight) as the (A) polyamide resin in Patent Reference 1.

However, the fibrous reinforcing material used in the resin compositions described in Patent References 1 and 2 have a circular cross section because of the easiness in their production, and in case where the fibrous reinforcing material having such a cross-sectional profile is used, even though it may improve the mechanical strength of articles, the fibrous reinforcing material is often ground into powder during injection-molding and the fiber length of the reinforcing material remaining in the molded articles may be shortened, thereby bringing about some problems in that the reinforcing effect of the reinforcing material is lowered, and the molded article is oriented owing to the orientation of the reinforcing material along the resin flow and is thereby warped; and for these reasons, the application of the fibrous reinforcing material of the type is limited to only specific parts. In Patent Reference 2, the fiber length of the fibrous reinforcing material dispersed in the injection-molded article is defined to be at least 1 mm in terms of the weight-average fiber length thereof, but no description is given therein relating to a method of measuring the weight-average fiber length and to the length of the fibers in the articles really formed therein.

Patent Reference 3 describes an invention of approximating the relation between the profile of the fiber length distribution in a long fiber reinforcing material-containing resin molded article, and the moldability and the physical properties of the molded article in accordance with two-parameter Weibull distribution, saying that, when the distribution profile is gentle and tailed from the short side to the long side of the fiber length, then the moldability and the physical properties of the molded article can be well balanced. Patent Reference 4 discloses an exterior molded article of a long fiber-reinforced thermoplastic resin whose anisotropy to be caused by the fiber orientation occurring in injection-molding is reduced, wherein the content of the reinforcing fibers dispersing in the molded article is from 30% by weight to 90% by weight, the weight-average fiber length is from 1.5 mm to 10 mm, the maximum projected area of the molded article is at least 20000 mm$^2$, the flow path length of a narrow flow path having a cross section of at most 100 mm$^2$ in molding is at most 150 mm, the maximum liner expansion coefficient of the part of the molded article having a wall thickness of at least 2 mm is at most $5 \times 10^{-5}$ K$^{-1}$, and the ratio of (maximum linear expansion coefficient)/(minimum linear expansion coefficient) is at most 1.8. However, the reinforcing material used in these techniques has an ordinary circular cross-sectional profile, and the techniques are not still satisfactory in point of the moldability and the impact strength with the fibrous reinforcing material having a long fiber length, the outward appearance of the molded articles, and the dimensional stability thereof free from molding shrinkage and warpage.

To solve these problems, Patent Reference 5 shows that, when the cross-sectional profile of glass fibers, as typical reinforcing fibers, is flattened, then the specific surface area thereof increases as compared with that of glass fibers having a circular cross section and the adhesiveness thereof to a matrix resin composition therefore increases, and when the fiber length in the molded article is prolonged (the average fiber length of the fibers having a circular cross-sectional profile is 0.47 mm, while the average fiber length of the fibers having a cocoon-molded cross-sectional profile is 0.57 mm), then the mechanical strength of the molded article is enhanced. The resin composition described in Patent Reference 5 may be effective for enhancing the tensile strength and the surface smoothness and for preventing the warpage, as compared with the resin composition containing glass fibers having a circular cross section, but is not still satisfactory; and in particular, when a polyamide resin is used as the thermoplastic resin, then the impact strength of the molded article often lowers to the same degree as that in the case where glass fibers having a circular cross section are used.

Patent Reference 6 discloses a method of prolonging the fiber length of the flattened glass fibers so as to solve the problems discussed in Patent Reference 5. Concretely, this describes provision of flattened glass fibers-containing thermoplastic resin pellets, in which a plurality of flattened glass fiber filaments having a flattened cross section are aligned in one direction so that both ends thereof may reach the pellet surface. Patent Reference 6 has a description relating to the length of the fibers remaining in the molded article, but is silent at all on the overall fiber length distribution and on the relationship between the fiber length distribution and the physical properties of the molded article. When the technique is employed, the impact strength of the molded article could be enhanced in some degree; however, since the length of the glass fibers remaining in the molded article is not sufficiently long (in the examples, the length is at most 0.49 mm), the technique could not still satisfactorily solve the problems of mechanical strength depression, strength retentiveness in high-temperature atmospheres, and dimensional change owing to resin shrinkage and warpage.

Patent Reference 1: JP-A 5-9380
Patent Reference 2: JP-A 6-107944
Patent Reference 3: JP-A 9-286036
Patent Reference 4: JP-A 2006-82275
Patent Reference 5: JP-B 2-60494
Patent Reference 6: JP-A 2006-45390

DISCLOSURE OF THE INVENTION

Problems that the Invention is to Solve

The invention has been made in consideration of the above-mentioned situation, and its object is to provide a fiber-reinforced thermoplastic resin molded article excellent in mechanical strength, heat resistance, dimensional accuracy such as warpage resistance, and surface appearance.

Means for Solving the Problems

The present inventors have assiduously studied to solve the above-mentioned problems and, as a result, have found that, when reinforcing fibers having a flattened cross-sectional profile are used, and at the same time, when the fiber length of the reinforcing fibers remaining in a molded article is kept long, concretely, when the weight-average fiber length of the reinforcing fibers is at least 1 mm, then not only the mechanical strength but also surprisingly the heat resistance, the dimensional accuracy and the surface appearance of the molded article can be all enhanced, and have reached the present invention.

Specifically, the subject matter of the invention resides in a fiber-reinforced thermoplastic resin molded article of a thermoplastic resin composition comprising from 70 to 35% by weight of a thermoplastic resin (A), and from 30 to 65% by weight of reinforcing fibers (B) of which the cross section is flattened to have a degree of flatness, as expressed by the formula mentioned below, of at least 2.3 (hereinafter referred to as "flattened reinforcing fibers"), wherein the weight-average fiber length of the reinforcing fibers in the molded article is at least 1 mm.

Concretely, the object of the invention is attained by the following:

(1) A fiber-reinforced thermoplastic resin molded article of a thermoplastic resin composition comprising from 70 to 35% by weight of a thermoplastic resin (A), and from 30 to 65% by weight of reinforcing fibers (B) of which the cross section is flattened to have a degree of flatness, as expressed by the formula mentioned below, of at least 2.3, wherein the weight-average fiber length of the reinforcing fibers in the molded article is at least 1 mm:

Degree of flatness=major diameter of reinforcing fiber ($a$)/minor diameter of reinforcing fiber ($b$).

(2) The fiber-reinforced thermoplastic resin molded article of (1), wherein the degree of flatness of the reinforcing fibers (B) is from 2.3 to 5.

(3) The fiber-reinforced thermoplastic resin molded article of (1) or (2), wherein the weight-average fiber length is from 1 to 10 mm.

(4) The fiber-reinforced thermoplastic resin molded article of any of (1) to (3), wherein the proportion of the reinforcing fibers having a fiber length of at least 1 mm in the molded article is at least 30% by weight of all the reinforcing fibers.

(5) The fiber-reinforced thermoplastic resin molded article of any of (1) to (4), wherein the cross-sectional profile of the reinforcing fibers (B) is oval.

(6) The fiber-reinforced thermoplastic resin molded article of any of (1) to (5), which contains at least one polyamide resin as the thermoplastic resin (A).

(7) The fiber-reinforced thermoplastic resin molded article of any of (1) to (5), which contains at least one polyester resin as the thermoplastic resin (A).

(8) The fiber-reinforced thermoplastic resin molded article of any of (1) to (5), wherein the thermoplastic resin (A) contains at least a polyamide resin obtained by polycondensation of a mixed diamine comprising from 0 to 50 mol % of paraxylylenediamine and from 50 to 100 mol % of metaxylylenediamine, and an $\alpha,\omega$-linear aliphatic dicarboxylic acid having from 6 to 12 carbon atoms.

(9) The fiber-reinforced thermoplastic resin molded article of any of (1) to (5), wherein at least 20% by weight of the thermoplastic resin (A) is a polyamide resin obtained by polycondensation of a mixed diamine comprising from 0 to 50 mol % of paraxylylenediamine and from 50 to 100 mol % of metaxylylenediamine, and an $\alpha,\omega$-linear aliphatic dicarboxylic acid having from 6 to 12 carbon atoms.

(10) The fiber-reinforced thermoplastic resin molded article of any of (1) to (5), which contains a polybutylene terephthalate resin and/or a polyethylene terephthalate resin as the thermoplastic resin (A).

(11) The fiber-reinforced thermoplastic resin molded article of any of (1) to (5), which contains a polybutylene terephthalate resin having a limiting viscosity, as measured in a 1/1 (by weight) mixed solution of phenol and 1,1,2,2-tetrachloroethane at 30° C., of from 0.3 to 1.2 dl/g, and having a titanium content of at most 80 ppm, as the thermoplastic resin (A).

(12) The fiber-reinforced thermoplastic resin molded article of any of (1) to (11), which is produced according to an injection-molding method or an extrusion-molding method using pellets prepared by coating reinforcing fiber rovings with the thermoplastic resin followed by cutting into pellets having a length of at least 3 mm.

(13) A method for producing a fiber-reinforced thermoplastic resin molded article of any one of (1) to (11), which comprises performing injection-molding or extrusion-molding of pellets prepared by coating reinforcing fiber rovings with the thermoplastic resin followed by cutting into pellets having a length of at least 3 mm.

EFFECT OF THE INVENTION

According to the invention, there can be obtained a fiber-reinforced thermoplastic resin molded article excellent not only in mechanical strength but also in heat resistance, dimensional accuracy and surface appearance. The resin molded article fully satisfies the requirements for weight reduction, thickness reduction, as well as improvement of dimensional accuracy and outward appearance, and is therefore utilizable for various applications of parts in the field of automobiles, in the field of electric and electronic appliances and in the field of precision machines; and the industrial value of the invention is remarkable.

BEST MODE FOR CARRYING OUT THE INVENTION

The contents of the invention are described in detail hereinunder. In this description, the numerical range expressed by the wording "a number to another number" means the range that falls between the former number indicating the lowermost limit of the range and the latter number indicating the uppermost limit thereof.

(A) Thermoplastic Resin:

Not specifically defined, the thermoplastic resin (A) for use in the invention may be any of crystalline thermoplastic resins and amorphous thermoplastic resins.

The crystalline thermoplastic resins include, for example, polyamide resins, polyester resins, polyacetal resins, polyolefin resins, etc. The amorphous thermoplastic resins include, for example, polycarbonate resins, polyphenylene ether resins, aromatic vinyl compound polymers, etc. Two or more different types of those thermoplastic resins may be used, as combined.

(Polyamide Resin)

The polyamide resin for use in the invention is a thermofusible polyamide polymer having an acid amide group (—CONH—) in the molecule. Concretely, it includes various polyamide resins such as lactam polycondensates, polycondensates of a diamine compound and a dicarboxylic acid compound, co-aminocarboxylic acid polycondensates, and their copolymerized polyamide resins and blends, etc.

The starting material, lactam for polycondensation to give polyamide resins includes, for example, ε-caprolactam, ω-laurolactam, etc.

The diamine compound includes, for example, aliphatic, alicyclic or aromatic diamine compounds such as tetramethylenediamine, pentamethylenediamine, hexamethylenediamine, octamethylenediamine, undecamethylenediamine, dodecamethylenediamine, 2-methylpentamethylenediamine, (2,2,4- or 2,4,4-)trimethylhexamethylenediamine, 5-methylnonane-methylenediamine, metaxylylenediamine (MXDA), paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl) methane, 2,2-bis(4-aminocyclohexyl)propane, bis (aminopropyl)piperazine, aminoethylpiperazine, etc.

The dicarboxylic acid compound includes, for example, aliphatic, alicyclic or aromatic dicarboxylic acids such as adipic acid, suberic acid, azelaic acid, sebacic acid, dodecane diacid, terephthalic acid, isophthalic acid, 2-chloroterephthalic acid, 2-methylterephthalic acid, 5-methylisophthalic acid, 5-sodium sulfoisophthalic acid, hexahydroterephthalic acid, hexahydroisophthalic acid, etc.

The ω-aminocarboxylic acid includes, for example, 6-aminocaproic acid, 11-aminoundecanoic acid, 12-aminododecanoic acid, paraminomethylbenzoic acid, etc.

Specific examples of the polyamide resins to be produced through polycondensation of any of these starting materials include polyamide 4, polyamide 6, polyamide 11, polyamide 12, polyamide 46, polyamide 56, polyamide 66, polyamide 610, polyamide 612, polyhexamethylene-terephthalamide (polyamide 6T), polyhexamethylene-isophthalamide (polyamide 6I), polymetaxylylene-adipamide (polyamide MXD6), polymetaxylylene-dodecamide, polyamide 9T, polyamide 9MT, etc. In the invention, these polyamide homopolymers or copolymers may be used singly or as a mixture thereof.

Of the above-mentioned polyamide resins, polyamide resins such as polyamide 6, polyamide 66 or MX nylon, which are widely known as polyamide MXD, are preferred for use herein from the viewpoint of the moldability and the heat resistance thereof. Of those, more preferred is MX nylon from the viewpoint of the heat resistance and the surface appearance of the molded articles. In case where the polyamide resin is a mixture, the proportion of MX nylon in the polyamide resin is preferably at least 20% by weight, more preferably at least 50% by weight, even more preferably at least 70% by weight.

MX nylon, a type of polyamide resin preferably used herein is a xylylenediamine-based polyamide resin obtained through polycondensation of an α,ω-linear aliphatic dicarboxylic acid and a xylylenediamine. In the invention, more preferred is a polyamide resin obtained through polycondensation of a mixed diamine comprising from 0 to 50 mol % of paraxylylenediamine and from 50 to 100 mol % of metaxylylenediamine, and an α,ω-linear aliphatic dicarboxylic acid having from 6 to 12 carbon atoms. The crystallization speed of the MX nylon is relatively low as compared with that of aliphatic polyamide resins such as polyamide 66, polyamide 6, polyamide 46 and polyamide 9T, and therefore, especially for the purpose of shortening the molding cycle, it is desirable that the MX nylon is combined with an aliphatic polyamide resin.

The aliphatic polyamide resin to be used for the purpose of shortening the molding cycle includes polyamide resins having a high crystallization speed, such as polyamide 66, polyamide 6 and polyamide 46, and polyamide resins having a high melting point such as polyamide 66/6T, 66/6T/6I, and polyamide 9T; and from the viewpoint of the economical aspect, preferred is polyamide 66 or polyamide 6. In view of the balance between the moldability and the physical properties, the proportion of the aliphatic polyamide resin to be combined is preferably at most 60% by weight of all the polyamide resins. When the proportion of the aliphatic polyamide resin is at most 60% by weight, then the resin composition may keep good heat resistance.

As the starting material for MX, α,ω-linear aliphatic dicarboxylic acid, preferred for use herein are α,ω-linear aliphatic dicarboxylic acids having from 6 to 20 carbon atoms, more preferably from 6 to 12 carbon atoms, for example, adipic acid, sebacic acid, suberic acid, dodecane diacid, eicodionic acid, etc. Of those α,ω-linear aliphatic dicarboxylic acids, more preferred is adipic acid in consideration of the balance between the moldability and the properties of the molded article.

Another starting material for MX, xylylenediamine is a metaxylylenediamine or a mixed xylylenediamine of paraxylylenediamine and metaxylylenediamine. The molar ratio of metaxylylenediamine to paraxylylenediamine in the mixed xylylenediamine is preferably from 50/50 to 100/0, more preferably from 55/45 to 100/0. When the molar proportion of paraxylylenediamine is at most 50 mol %, then it is favorable since the melting point of the polyamide resin may be kept low therefore facilitating polymerization into MX nylon and molding of the MX nylon-containing resin composition. In particular, when the proportion of paraxylylenediamine is at least 10 mol %, then it is favorable since the crystallization speed of the polyamide resin may be high and the amount of the aliphatic polyamide resin to be in the resin composition may be reduced.

The relative viscosity of the polyamide resin is preferably from 2.0 to 4.0, more preferably from 2.0 to 2.7. When the relative viscosity is at least 2.0, then it is favorable since the polyamide resin composition may be prevented from becoming brittle; and when at most 4.0, then it is also favorable since the flowability of the polyamide resin composition in molding may be bettered thereby facilitating the molding of the composition. In the invention, the relative viscosity means the viscosity measured using 96% sulfuric acid as a solvent under the condition of a resin concentration of 1 g/100 ml and a temperature of 23° C.

The terminal amino group concentration in the polyamide resin is preferably from 10 to 140 eq/ton, more preferably from 30 to 100 eq/ton, from the viewpoint of the molecular weight of the polymer. The terminal carboxyl group concentration in the polyamide resin is preferably from 10 to 140 eq/ton, more preferably from 30 to 100 eq/ton, from the viewpoint of the molecular weight of the polymer.

(Polyester Resin)

The polyester resin in the invention is preferably a polymer or copolymer obtained through polycondensation of an aromatic dicarboxylic acid or its derivative and an aliphatic glycol. One or more polyester resins may be used herein either singly or as combined.

The aromatic dicarboxylic acid or its derivative includes, for example, terephthalic acid, phthalic acid, isophthalic acid, 2,6-naphthalenedicarboxylic acid, 4,4'-diphenyldicarboxylic acid, 4,4'-diphenylether-dicarboxylic acid, 4,4'-benzophenonedicarboxylic acid, 4,4'-diphenoxyethanedicarboxylic acid, 4,4'-diphenylsulfonedicarboxylic acid, and their alkyl (e.g., having from 1 to 4 carbon atoms) or glycol esters. Above all, more preferred are terephthalic acid and its dialkyl esters; even more preferred are terephthalic acid and its dimethyl ester. One or more such aromatic dicarboxylic acids may be used either singly or as combined.

The aromatic dicarboxylic acid or its derivative may be used, as mixed with a small amount of any other dibasic acid or polybasic acid or their alkyl or glycol ester, or the like. For example, an aliphatic dicarboxylic acid such as adipic acid or sebacic acid, or an alicyclic dicarboxylic acid such as 1,2-cyclohexanedicarboxylic acid, 1,3-cyclohexanedicarboxylic acid or 1,4-cyclohexanedicarboxylic acid, or a polybasic acid such as trimesic acid or trimellitic acid, or their alkyl and glycol esters or the like may be mixed in an amount of at most 20% by weight of the aromatic dicarboxylic acid or its derivative.

The aliphatic glycol is preferably a glycol having from 2 to 20 carbon atoms, including ethylene glycol, propylene glycol, tetramethylene glycol, hexamethylene glycol, diethylene glycol, dibutylene glycol, polyethylene glycol, polypropylene glycol, polytetramethylene glycol, etc. One or more these glycols may be used either singly or as combined.

The aliphatic glycol may be used, as mixed with a small amount of any other glycol or polyalcohol or the like. For example, an alicyclic glycol such as cyclohexanediol or cyclohexanedimethanol, or an aromatic glycol such as xylylene glycol, 2,2-bis(4-hydroxyphenyl)propane, 2,2-bis(4-hydroxy-3,5-dibromophenyl)propane, 2,2-bis(4-hydroxyethoxyphenyl)propane or 2,2-bis(4-hydroxyethoxy-3,5-dibromophenyl)propane, or a polyalcohol such as glycerin or pentaerythritol may be mixed in an amount of at most 20% by weight of the aliphatic glycol.

The polyester resin for use in the invention may comprise, in addition to the above-mentioned components, a hydroxycarboxylic acid such as lactic acid, glycolic acid, m-hydroxybenzoic acid, p-hydroxybenzoic acid, 6-hydroxy-2-naphthalenecarboxylic acid or p-β-hydroxyethoxybenzoic acid, or a monofunctional ingredient such as alkoxycarboxylic acid, steargl alcohol, benzyl alcohol, stearic acid, benzoic acid, tert-butylbenzoic acid or benzoylbenzoic acid, as a copolymerizing component.

The polyester resin typically includes a polyalkylene terephthalate resin or a copolymer mainly comprising it; and concretely preferred are polyethylene terephthalate resin, polybutylene terephthalate resin and their copolymers excellent in mechanical strength and heat resistance. In case where the resin copolymer is used, preferably, terephthalic acid accounts for at least 50 mol % of all the dicarboxylic acid component, more preferably at least 70 mol %, even more preferably at least 90 mol %. Also preferably, ethylene glycol or tetramethylene glycol accounts for at least 50 mol % of all the glycol component, more preferably at lest 70 mol %, even more preferably at least 90 mol %. Using the polyalkylene terephthalate resin of the type is preferred, as tending to enhance more the mechanical strength and the heat resistance.

As the polyester resin in the invention, preferred is a polybutylene terephthalate resin, and more preferred is a polybutylene terephthalate resin having a limiting viscosity, as measured in a 1/1 (by weight) mixed solvent of phenol and 1,1,2,2,-tetrachloroethane at a temperature of 30° C., of from 0.3 to 1.2 dl/g. When the polybutylene terephthalate resin has a limiting viscosity of at least 0.3 dl/g, then it further betters the mechanical properties of the fiber-reinforced polyester resin to be obtained. When the limiting viscosity is at most 1.2 dl/g, then the flowability of the fiber-reinforced polyester resin may be kept good, and the moldability thereof may be thereby enhanced. In addition, the reinforcing fibers may be prevented from being bent or broken during the molding process, and therefore the fiber length of the reinforcing fibers in the molded article may be kept long and the mechanical strength of the article may be prevented from being lowered. Two or more types of polybutylene terephthalate resins differing in point of the limiting viscosity may be combined to give a mixed polybutylene terephthalate resin for use herein, having a limiting viscosity that falls within the above range.

For preventing the reduction in the strength of the polybutylene terephthalate resin by hydrolysis, the titanium content of the polybutylene terephthalate resin is preferably at most 80 ppm, more preferably at most 60 ppm. The titanium content may be controlled by controlling the amount of the titanium compound to be used in producing the polybutylene terephthalate resin.

As the polyester resin, also preferably usable herein is a polyethylene terephthalate resin. In case where the polyester resin is a polyethylene terephthalate resin, its limiting viscosity is preferably from 0.5 to 0.9 dl/g. Having a limiting viscosity that falls within the range, the resin may have good moldability and may enhance the mechanical strength of the resin composition to be obtained. Two or more types of polyethylene terephthalate resins differing in point of the limiting viscosity may be combined to give a mixed polyethylene terephthalate resin for use herein, having a limiting viscosity that falls within the above range.

When the polyester resin is produced, employable is any known method. For example, in case where a polybutylene terephthalate resin comprising a terephthalic acid component and a tetramethylene glycol component is produced, employable is any method of a direct polymerization method or an interesterification method. The direct polymerization method is, for example, a method of direct esterification of terephthalic acid and tetramethylene glycol, in which water is formed in the initial stage of esterification. The interesterification method is, for example, a method of using dimethyl terephthalate as the main starting material, in which an alcohol is formed in the initial stage of interesterification. The direct esterification is preferred from the viewpoint of the cost of starting materials.

In case where a polymerization catalyst is used, a titanium compound is preferably selected. The titanium compound is not specifically defined. Concretely, for example, it includes inorganic titanium compounds such as titanium oxide, and titanium tetrachloride; titanium alcoholates such as tetramethyl titanate, tetraisopropyl titanate, and tetrabutyl titanate; and titanium phenolates such as tetraphenyl titanate etc. Of those, preferred are titanium alcoholates; more preferred are tetraalkyl titanates; and even more preferred is tetrabutyl titanate. The polymerization catalyst is fed as its solution in water, tetramethylene glycol or the like, and its amount to be fed is preferably at most 80 ppm, in terms of the titanium atom per the theoretical yield of the polybutylene terephthalate resin, more preferably at most 60 ppm.

Regarding the starting material feeding system and the polymer collection system, the polyester resin may be produced in any method of a batch method or a continuous method. The initial-stage esterification or interesterification may be attained in a continuous mode, and the subsequent polycondensation may be attained in a batch operation mode; or contrary to it, the initial-stage esterification or interesterification may be attained in a batch operation mode, and the subsequent polycondensation may be attained in a continuous mode.

(Polyacetal Resin)

The polyacetal resin in the invention is a polymer produced through polymerization of formaldehyde or trioxane, and for example, the polyacetal resin is a homopolymer comprising an oxymethylene group as the repetitive unit. For increasing the heat resistance and the chemical resistance, in general, the terminal group is converted into an ester group or an ether group.

The polyacetal resin may be a block copolymer. The copolymer of the type comprises a homopolymer block comprising the above-mentioned oxymethylene group as the repetitive unit and any other polymer block. Specific examples of the other polymer block include, for example, polyalkylene glycol, polythiol, vinyl acetate-acrylic acid copolymer, hydrogenated butadiene-acrylonitrile copolymer, etc. The polyacetal resin may be a random copolymer. In the copolymer of the type, formaldehyde and trioxane are copolymerized with any other aldehyde, cyclic ether, vinyl compound, ketene, cyclic carbonate, epoxide, isocyanate, ether or the like. Specific examples of the copolymerizing compound include ethylene oxide, 1,3-dioxolan, 1,3-dioxane, 1,3-dioxepan, epichlorohydrin, propylene oxide, isobutylene oxide, styrene oxide, etc. In the copolymer of the type, in general, the polymerization is inactivated and the terminal is stabilized after cationic polymerization. A copolymer comprising an oxymethylene group as the main repetitive unit and containing an oxyalkylene group having at least 2 carbon atoms is also well used herein.

(Polyolefin Resin)

The polyolefin resin in the invention includes a homopolymer of α-olefin, a copolymer of α-olefins, and a copolymer comprising α-olefin(s) as the main ingredient and any other unsaturated monomer(s) as the side ingredient. The copolymer may be any type of block, random or graft copolymers or their hybrid copolymers. It includes olefin polymers modified through chlorination, sulfonylation, carbonylation or the like.

The α-olefin includes, for example ethylene, propylene, butene-1, pentene-1, hexene-1, heptene-1, octene-1, etc. Of those, preferred are α-olefins having from 2 to 8 carbon atoms because of easy availability thereof.

The unsaturated monomer includes, for example, unsaturated organic acids such as acrylic acid, methacrylic acid (these are abbreviated as "(meth)acrylic acid" as combined), (meth)acrylates, maleic acid, and their derivatives (esters, anhydrides, etc.), unsaturated aliphatic cyclic olefins, etc.

Specific examples of the polyolefin resin include low-density polyethylene, middle-density polyethylene, high-density polyethylene, polypropylene, polybutene, poly-4-methylpentene-1, propylene/ethylene block or random copolymer, copolymer of ethylene with any other copolymerizable monomer, etc.

(Polycarbonate Resin)

The polycarbonate resin in the invention may be any of aromatic polycarbonate resin or aliphatic polycarbonate resin; but preferred is aromatic polycarbonate resin.

The aromatic polycarbonate resin is a thermoplastic polymer obtained by reacting an aromatic dihydroxy compound or its mixture with a small amount of a polyhydroxy compound, and phosgene or a dicarbonate. The aromatic polycarbonate resin may be branched, or may be a copolymer. The method for producing the aromatic polycarbonate resin is not specifically defined. The resin may be produced according to a conventional known phosgene method (interfacial polymerization method) or melt method (interesterification method). In case where an aromatic polycarbonate resin obtained according to a melt method is used, the terminal OH group level of the resin may be controlled.

The aromatic hydroxy compound to be the starting material for the aromatic polycarbonate resin includes 2,2-bis(4-hydroxyphenyl)propane (i.e., bisphenol A), tetramethylbisphenol A, bis(4-hydroxyphenyl)-p-diisopropylbenzene, hydroquinone, resorcinol, 4,4-dihydroxydiphenyl, etc. Preferred is bisphenol A. Also usable are compounds in which at least one tetraalkylphosphonium sulfonate combines with the aromatic dihydroxy compound.

For obtaining a branched aromatic polycarbonate resin, a part of the above-mentioned aromatic hydroxy compound may be substituted with a branching agent, for example, a polyhydroxy compound such as phloroglucine, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl) benzene, or 1,1,1-tri(4-hydroxyphenyl)ethane; or a compound such as 3,3-bis(4-hydroxyaryl)oxyindole (i.e., isatin biphenol), 5-chloroisatin, 5,7-dichloroisatin, 5-bromoisatin, etc. The amount of the compound to be used may be generally from 0.01 to 10 mol % relative to the aromatic dihydroxy compound, preferably from 0.1 to 2 mol %.

Of those mentioned above for the aromatic polycarbonate resin, preferred are polycarbonate resins derived from 2,2-bis (4-hydroxyphenyl)propane, or polycarbonate copolymers derived from 2,2-bis(4-hydroxyphenyl)propane and any other aromatic dihydroxy compound. Also usable herein are copolymers comprising a polycarbonate resin as the main ingredient, such as copolymers with a siloxane structure-having polymer or oligomer. In addition, two or more of the above-mentioned aromatic polycarbonate resins may be mixed for use herein.

The molecular weight of the aromatic polycarbonate resin is, in terms of the viscosity-average molecular weight converted from the solution viscosity thereof measured using methylene chloride as the solvent at a temperature of 25° C., preferably from 13,000 to 30,000, more preferably from 16,000 to 28,000, even more preferably from 17,000 to 24,000. Having a viscosity-average molecular weight of at most 30,000, the resin may have good flowability; and having at least 13,000, the resin may produce more excellent impact strength.

(Polyphenylene Ether Resin)

The polyphenylene ether resin in the invention is a homopolymer or a copolymer having a phenylene ether structure of the following general formula (1):

[Formula 1]

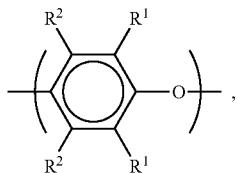

(1)

In formula (1), two $R^1$'s each independently represent a hydrogen atom, a halogen atom, a primary or secondary alkyl group, aryl group, an aminoalkyl group, a hydrocarbon-oxy group or a halohydrocarbon-oxy group; two $R^2$'s each independently represent a hydrogen atom, a halogen atom, a primary or secondary alkyl group, an aryl group, a haloalkyl group, a hydrocarbon-oxy group or a halohydrocarbon-oxy group. However, both two $R^1$'s must not be hydrogen atoms.

For $R^1$ and $R^2$, preferred are a hydrogen atom, a primary or secondary amino group and an aryl group. Preferred examples of the primary alkyl group include, for example, a methyl group, an ethyl group, an n-propyl group, an n-butyl group, an n-amyl group, an isoamyl group, a 2-methylbutyl group, an n-hexyl group, a 2,3-dimethylbutyl group, a 2-, 3- or 4-methylpentyl group, a heptyl group, etc. Preferred examples of the secondary amino group include, for example, an isopropyl group, a sec-butyl group, a 1-ethylpropyl group, etc. Preferred examples of the aryl group include, for example, a phenyl group, a naphthyl group, etc. Especially preferably, $R^1$ is a primary or secondary alkyl group having from 1 to 4 carbon atoms, or a phenyl group. More preferably, $R^2$ is a hydrogen atom.

Preferred examples of the polyphenylene ether homopolymer include, for example, 2,6-dialkylphenylene ether polymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, etc. The copolymer includes various types of 2,6-dialkylphenol/2,3,6-trialkylphenol copolymers.

For the polyphenylene ether resin for the invention, especially preferred are poly(2,6-dimethyl-1,4-phenylene)ether, 2,6-dimethylphenol/2,3,6-trimethylphenol copolymer. Also preferred are polyphenylene ether resins having a molecule-constitutive moiety capable of improving the properties such as the molecular weight, the melt viscosity and the impact resistance.

The limiting viscosity of the polyphenylene ether resin is, as measured in chloroform at 30° C., preferably from 0.2 to 0.8 dl/g, more preferably from 0.2 to 0.7 dl/g, even more preferably from 0.25 to 0.6 dl/g. Having a limiting viscosity of at least 0.2 dl/g, the resin may prevent the reduction in the mechanical strength such as the impact resistance of the resin composition; and having at most 0.8 dl/g, the flowability of the resin may be good therefore facilitating the molding of the resin composition.

(Aromatic Vinyl Compound Polymer)

The aromatic vinyl compound polymer is a polymer derived from a monomer compound having a structure shown by the following general formula (2):

[Formula 2]

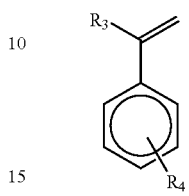

(2)

In formula (2), $R^3$ represents a hydrogen atom, a lower alkyl group or a halogen atom; $R^4$ represents a hydrogen atom, a lower alkyl group, a chlorine atom or a vinyl group.

Specific examples of the aromatic vinyl compound polymer include, for example, polystyrene, rubber-reinforced polystyrene, polyvinyl chloride, styrene/acrylonitrile copolymer, acrylonitrile/butadiene/styrene copolymer, styrene/maleic anhydride copolymer, styrene/maleimide copolymer, etc.

As the thermoplastic resin in the invention, preferred are the above-mentioned polyamide resin and polyester resin from the viewpoints of its excellence in the balance of mechanical strength, oil resistance, chemical resistance, heat resistance, durability and moldability.

(B) Flattened Reinforcing Fibers:

The flattened reinforcing fibers in the invention are a fibrous reinforcing material known as glass fibers, carbon fibers or the like incorporated into plastics mainly for the purpose of improving the mechanical strength thereof, and are characterized in that the cross section of the fiber is not circular like that of conventional ones, but is flattened. Examples of flattened reinforcing fibers are shown as cocoon-shaped, oval or ellipse ones of (i), (ro) and (ha), respectively, in FIG. 1 in Patent Reference 5. In FIG. 1, the major diameter is indicated by (a), and the minor diameter is by (b). The degree of flatness of the reinforcing fibers is represented by major diameter (a)/minor diameter (b). In the present invention, the degree of flatness of the reinforcing fibers must be at least 2.3, preferably from 2.3 to 5, more preferably from 3 to 4.5. Having a degree of flatness of at least 2.3, the fibers may effectively prevent the molded articles from warping or shrinking during molding. The major diameter (a) and the minor diameter (b) of the reinforcing fibers for computing the degree of flatness thereof are determined by measuring the actual dimension of the cross section of the fiber on a microscopic photograph thereof.

The area of the cross section of the flattened reinforcing fibers (B) is preferably from $2 \times 10^{-5}$ to $8 \times 10^{-3}$ mm$^2$, more preferably from $8 \times 10^{-5}$ to $8 \times 10^{-3}$ mm$^2$, even more preferably from $8 \times 10^{-5}$ to $8 \times 10^{-4}$ mm$^2$. Having the cross-section area that falls within the above range, the reinforcing fibers are favorable as they are easily handled in their production or in production of resin composition pellets to be used for molding. When the reinforcing fibers having the above-mentioned cross-section area range are used, the contact area between the fibers and a thermoplastic resin may be large and the fibers may exhibit a sufficient reinforcing effect.

The content of the flattened reinforcing fibers (B) may be from 30 to 65% by weight relative to the total of the component (A) and the component (B) of 100% by weight, preferably from 35 to 60% by weight. When the content of the component (B) is at most 65% by weight, it is favorable since the flowability of the resin composition in molding may be good, and in addition, since the reinforcing fibers may be prevented from being broken during molding and the fiber length in the molded article may be kept long, and the mechanical strength of the molded article may thereby be prevented from lowering. The lowermost limit of the content may be basically the same as in a case of using conventional reinforcing fibers having a circular cross-sectional profile; and when the content is at least 20% by weight, the mechanical strength may be improved. However, when the content of the reinforcing fibers is less than 30% by weight, then the resin flowability in molding is good and therefore almost all the reinforcing fibers may be oriented in the resin flowing direction irrespective of the cross-sectional profile of the fibers; and if so, the flattened reinforcing fibers added to the resin composition could not sufficiently exhibit the effect of enhancing and improving the dimensional accuracy (in point of the degree of molding shrinkage and the anisotropy of the degree of shrinkage), the warpage resistance and the surface appearance of the molded article, and therefore the difference between the reinforcing fibers having a flattened cross-sectional profile and those having a circular cross-sectional profile is not clear.

As opposed to this, in case where the content of the flattened reinforcing fibers (B) is at least 30% by weight, the characteristics of the reinforcing fibers themselves come to appear remarkably. With the increase in the content of the reinforcing fibers, the resin flowability in molding may lower, and further for preventing the reinforcing fibers from being broken and for securing the long reinforcing fiber length, the resin composition is plasticized and injection-molded at a low shear speed, and therefore the orientation of the reinforcing fibers in the resin flow direction may be retarded lower. In case where the flattened reinforcing fibers are used and especially where the degree of flatness of the cross section of the fibers is large, the resin flow may occur in the direction of the major diameter (a) of the fiber cross section in addition to the resin flow in the fiber length direction, and therefore the reinforcing fibers may be readily oriented in the direction parallel to the direction (a). Especially in the vicinity of the surface of the molded article, the orientation of the type is stronger. Owing to the influence of the fiber orientation, which is characterized in the flattened reinforcing fibers, and which is generally free from ordinary fibers having a circular cross-sectional profile, the flattened reinforcing fibers can exhibit the effect of improving the dimensional accuracy, the warpage resistance and the surface appearance.

In addition, since the reinforcing fibers are aligned along the direction of the major diameter (a) and since the fiber length of the reinforcing fibers in the molded article is long, it may be understood that, in the fiber-reinforced thermoplastic resin molded article of the invention, the matrix resin is hardly warped even under heat applied thereto, and therefore the molded article can exhibit better heat resistance.

The influence of the fiber orientation along the direction of the major diameter (a) is more remarkable when the cross section of the fibers are oval, and therefore, in the invention, preferred are reinforcing fibers having a oval cross section. In a case where the cross section has a cocoon-like profile or an ellipse profile, the resin flow in the direction of the major diameter (a) may be retarded by the cocoon grooves or by the ellipse embankment, and a part of the flow tends to run in the fiber length direction, and as a result, the orientation of the reinforcing fibers in the direction (a) hardly occurs and, as compared with that of the oval reinforcing fibers, the effect of the cocoon-like or ellipse reinforcing fibers for improving the dimensional accuracy, the warpage resistance, the heat resistance and the surface appearance of the molded article may be poor in some degree. In the invention, the oval form is meant to indicate a form having parts nearly parallel to the positions that are symmetric relative to the gravity point of the cross section of the fiber, as in FIG. 1-(B) in JP-B 2-60494.

Preferably, the flattened reinforcing fibers (B) are optionally surface-treated with a fiber binder and/or a surface-treating agent before use, from the standpoint of the handlability and the adhesiveness thereto to resin. As the fiber binder and/or the surface-treating agent, for example, usable are ordinary fiber binder and surface-treating agents such as epoxy compounds, isocyanate compounds, silane compounds, and titanate compounds. Preferably, its amount to be adhered is at least 0.05% by weight of the reinforcing fibers. The reinforcing fibers may be previously processed for surface treatment or fiber-binding treatment with any of these compounds, or the agent may be added to the resin composition in preparing the resin composition pellets for the resin molded article of the invention.

The flattened reinforcing fibers (B) of the type may be produced by spinning through a nozzle having a suitable orifice profile such as a oval, cocoon-shaped, ellipse or rectangular slit-like profile, as the bushing for spinning out the fiber melt through it. The melt may be spun out through plural nozzles provided near to each other and having any of various cross-sectional profiles (including a circular cross-sectional profile), and the thus-spun melt filaments may be bonded together into a single filament. In that manner, the fibers can also be produced. The production techniques are disclosed, for example, in JP-A 7-291649 and 2000-344541.

In the invention, the weight-average fiber length of the reinforcing fibers in the molded article is at least 1 mm, preferably from 1 to 10 mm, more preferably from 1.5 to 8 mm. In particular, in the invention, the proportion of the reinforcing fibers having a length of at least 1 mm is preferably at least 30% by weight of all the reinforcing fibers from the viewpoint of the mechanical strength and the strength retentiveness at high temperatures. When the proportion of the reinforcing fibers having a weight-average fiber length of at least 1 mm in the molded article is more preferably from 33% by weight to 95% by weight of all the reinforcing fibers.

The length of the reinforcing fibers may be measured as follows: About 5 g of is sampled out of the center of the molded article, then ashed in an electric furnace at a temperature of 600° C. for 2 hours, and the reinforcing fibers having remained in the sample are analyzed. Not broken, the obtained reinforcing fibers are dispersed in an aqueous solution of a neutral surfactant, and the aqueous dispersion is transferred onto a slide glass with a pipette, and its photographic picture is taken via a microscope. Using an image-analyzing software, from 1000 to 2000 reinforcing fibers on the photographic image are analyzed.

To attain the above-mentioned condition, at least the defined fiber length must be secured at least in the stage of the resin composition pellets to be subjected to injection-molding or extrusion-molding. As a method for producing the resin composition pellets in which the defined fiber length is secured, for example, employable is a method of pressing both sides of a reinforcing fiber mat with a molten resin sheet followed by cutting it with a sheet cutter to give rectangular granules, or a method of coating the surface of reinforcing fiber rovings with a resin to give coated strands in a manner of producing covered cables, followed by cutting them into pellets. In case where resin composition pellets are produced by melt-kneading, the kneading condition is so selected that the reinforcing fibers are not broken during kneading. Of those methods, preferably employed herein is a pultrusion method (U.S. Pat. No. 3,042,570, JP-A 53-50279, etc.) from the viewpoint that the reinforcing fibers can be efficiently aligned in parallel to the direction of the length of the pellets and that the fiber dispersion may be bettered.

The pultrusion method is a method basically comprising infiltrating a resin into reinforcing fibers while continuous bundles of the reinforcing fibers are drawn, for which are applicable all known techniques disclosed by various patents (roving profiles of reinforcing fibers, preheating method for reinforcing fibers, opening method, method of infiltrating thermoplastic resin into reinforcing fibers, shaping method after resin infiltration, cooling method, cutting method, etc.). In consideration of the breaking trouble of reinforcing fibers in injection-molding or extrusion-molding, the size of the long fiber-reinforced pellets is at least 1 mm in terms of the pellet length (that is, the length of the reinforcing fibers), preferably at least 3 mm; and more preferred are columnar pellets having a pellet length of from 3 to 50 mm and a pellet diameter of from 1.5 to 4 mm. When the long fiber-reinforced pellets containing the reinforcing fibers having the same length as that of the pellets are used in injection-molding or extrusion-molding, then the molded article of the invention can be produced efficiently and stably, with retarding the bulk density increase, and preventing the occurrence of bridges inside the hopper during molding and preventing a phenomenon of poor engaging with screws.

In case where the resin composition pellets are produced by melt-kneading, for example, used are various extruders, Blavender plastographs, laboratory plastomills, kneaders, Banbury mixers, etc. In the invention, preferred is a method of using, as a kneading machine, a double-screw extruder equipped with a unit for degassing through the vent thereof. The thermoplastic resin (A) and optional additives thereto may be premixed with a ribbon blender, a Henschel mixer or the like, or may be put into the melt-kneading machine without being premixed; however, it is desirable that the flattened reinforcing fibers (B) are separately put into the system via the exclusive inlet port provided on the downstream side of the double-screw extruder, and also preferably, the mixing time and the number of screw rotation are so controlled that the reinforcing fibers being mixed could be protected from being broken as much as possible.

The heating temperature in melt-kneading varies depending on the type of the thermoplastic resin used, but in the invention, it is desirable that the plasticizing temperature of the melting resin is set higher than usual for the reducing the pressure of the melting resin in melt-kneading. For example, in case where a polyamide resin or a polyester resin is melt-kneaded, it is generally plasticized at 220 to 280° C., but preferably in the invention, it is plasticized at a higher temperature than usual, or at 260 to 280° C. for the purpose of reducing the pressure of the melting resin in kneading and for preventing the reinforcing fibers being mixed from being broken as much as possible.

The heating temperature in melt-kneading varies depending on the type of the thermoplastic resin used, but in the invention, it is desirable that the plasticizing temperature of the melting resin is set higher than usual for reducing the pressure of the melting resin in melt-kneading. For example, in case where a polyamideamide resin or a polyester resin is melt-kneaded, it is generally plasticized at 220 to 280° C., but preferably in the invention, it is plasticized at a higher temperature than usual, or at 260 to 280° C. for the purpose of reducing the pressure of the melting resin in kneading and for preventing the reinforcing fibers being mixed from being broken as much as possible.

Employing any of the above-mentioned conditions or combining a plurality of those conditions makes it possible to keep the fiber length of the reinforcing fibers in the resin composition pellets long. In case where the resin composition pellets are produced by melt-kneading, the preferred fiber length of the reinforcing fibers in the resin composition pellets is from 1 to 20 mm, more preferably from 1.5 to 20 mm, even more preferably from 2 to 15 mm.

Apart from the above-mentioned methods, also effective is a method of premixing a thermoplastic resin (A), flattened reinforcing fibers (B) and optional additive components, in a ribbon blender, a Henschel mixer, a drum blender or the like, and, directly using the dry blend for molding as it is, not melt-kneading it. According to the method, the reinforcing fibers are prevented from being broken owing to the melt-kneaded, and therefore, the fiber length of the reinforcing fibers in the molded article obtained can be kept longer.

Apart from the methods of using the above-mentioned long fiber-reinforced pellets, melt-kneaded resin composition pellets or dry blend, there are mentioned other various methods for protecting the reinforcing fibers from being broken during injection-molding or extrusion-molding and for increasing the proportion of the reinforcing fibers having a fiber length of at least 1 mm in the molded article, for example, methods of selection of molding machine conditions of screw constitution, screw and cylinder inner wall modification, nozzle diameter, mold structure or the like, methods of controlling molding conditions in plasticization, material metering, injection or the like, methods of adding other components to molding materials, etc.

Regarding molding machines, for example, employable is a method of using a screw structure for milder compression so as not to give any rapid shearing to an unmelted resin, or a method of enlarging the clearance of the check valve at the tip of the screw in an in-line screw molding machine.

In controlling the molding condition, in particular, plasticization or injection at a high shear speed must be evaded. In the invention, as the condition in plasticization, material metering and injection, for example, it is desirable to control the cylinder temperature, the back pressure, the screw rotating speed, and the injection speed. The cylinder temperature must be suitably controlled depending on the type of the thermoplastic resin used; and for example, in case where the thermoplastic resin is a polyamide resin, the temperature is preferably so set as to be from 270 to 320° C., more preferably from 280 to 300° C. In case where the thermoplastic resin is a polyester resin, the temperature is preferably set to be from 250 to 300° C., more preferably from 260 to 280° C.

In case where the back pressure is controlled, it is preferably set to be from 0.2 to 5 MPa, more preferably from 0.3 to 3 MPa. In case the screw rotating speed is controlled, preferably, it is set to be from 30 to 150 rpm, more preferably from 40 to 100 rpm. In case where the injection speed is controlled, preferably it is set to be from 10 to 100 mm/sec, more preferably from 10 to 50 mm/sec.

In order not to detract from the moldability, the reinforcing fiber dispersibility and the molded article properties, any of the molding machine conditions or the molding conditions of cylinder temperature, back pressure, screw rotating speed, injection speed and the like are controlled within the above-mentioned preferred range, or two or more of those conditions within the preferred range are combined, whereby the resin composition can be molded at a suitable melt viscosity and under a suitable pressure thereby giving a molded article having excellent surface appearance, with protecting the reinforcing fibers from being broken.

In addition, a method of adding a molding material to other components is also effective. For example, a method of adding a lubricant to thereby lower the resin melt viscosity in injection-molding, and a method of adding a plasticizer to improve the resin flowability are effective.

The lubricant includes, for example, metal salts of fatty acids such as metal salts of stearic acid and metal salts of montanic acid, long-chain saturated fatty acid waxes, amide-based waxes, etc. Preferably, any of these is added within a range not having any significant influence on the mechanical properties of the molding material. The amount of the lubricant to be added is, for example, preferably from 0.01 to 5 parts by weight relative to 100 parts by weight of the thermoplastic resin (A), more preferably from 0.05 to 3 parts by weight.

The plasticizer includes, for example, pyrrolidone-carboxylic acid compounds, parahydroxybenzoic acid and others that are solid at room temperature but become liquid at the melting point thereof; and preferably, the plasticizer is added within a range not having any significant influence on the mechanical properties of the molding material. The amount of the plasticizer to be added is, for example, preferably from 0.01 to 5 parts by weight relative to 100 parts by weight of the thermoplastic resin (A), more preferably from 0.05 to 2 parts by weight.

In producing the above-mentioned resin composition pellets, any other components than the above-mentioned indispensable components and optional components may be added thereto within a range not detracting from the properties of the resin composition of the invention. They include, for example, a crystal nucleating agent such as talc; a stabilizer such as a copper halide (e.g., copper iodide, copper chloride, copper bromide) and/or an alkali metal halide (e.g., potassium iodide, potassium bromide); an antioxidant such as hindered phenols and phosphates; inorganic filler except the component (B), such as wollastonite; and a releasability improver, a flame retardant and/or flame co-retardant, a pigment, a dye, a dispersant, an antistatic agent, a UV absorbent, an impact modifier, and other known additives.

In the invention, in case where the thermoplastic resin (A) is crystalline, a crystal nucleating agent of the above-mentioned additives is preferably added thereto for increasing the crystallization speed and enhancing the moldability thereof. The crystal nucleating agent may be an inorganic crystal nucleating agent such as talc or boron nitride; but an organic crystal nucleating agent may also be used. The amount of the crystal nucleating agent to be added is preferably from 0.01 to 10 parts by weight relative to 100 parts by weight of the thermoplastic resin (A), more preferably from 0.05 to 5 parts by weight. When its amount is at least 0.01 parts by weight, the crystal nucleating agent added may sufficiently exhibit its effect; and when at most 10 parts by weight, it is favorable since it does not cause strength or impact resistance depression owing to the impurity effect and since the agent in an amount more than required is not added and therefore the cost is low.

Preferably, a releasability improver is added to the thermoplastic resin composition of the invention for improving the releasability in molding. The releasability improver includes, for example, long-chain aliphatic carboxylic acids having at least 14 carbon atoms such as stearic acid and palmitic acid, and their derivatives (e.g., esters, alkali metal salts, alkaline earth metal salts, amides); higher aliphatic alcohols having at least 14 carbon atoms such as stearyl alcohol, and their derivatives; amines having at least 14 carbon atoms such as stearylamine, and their derivatives; waxes such as low-molecular-weight polyethylene wax and paraffin wax; and silicone oil, silicone rubber, etc. Its amount to be added may be generally from 0.01 to 5 parts by weight relative to 100 parts by weight of the thermoplastic resin (A), preferably from 0.1 to 3 parts by weight. When the amount falls within the above range, then it is favorable since the agent may fully exhibit the releasability-improving effect thereof and since gas generation during molding may be prevented and the surface appearance of the molded article may be prevented from being worsened.

The impact modifier includes, for example, $\alpha$-olefin-based, styrene-based, acrylic-based or silicone-based thermoplastic elastomers, and core/shell polymers such as methyl methacrylate/butadiene/styrene resins. It amount to be added may be generally from 1 to 30 parts by weight relative to 100 parts by weight of the thermoplastic resin (A), preferably from 1 to 20 parts by weight, more preferably from 3 to 10 parts by weight.

Specific examples of the inorganic filler except the component (B) include, for example, glass fibers, carbon fibers and aramide fibers having a circular cross section, as well as mica, talc, wollastonite, potassium titanate, calcium carbonate, silica, etc. Its amount to be added may be generally from 1 to 50 parts by weight relative to 100 parts by weight of the thermoplastic resin (A), preferably from 3 to 40 parts by weight, more preferably from 5 to 30 parts by weight.

Further, the thermoplastic resin composition for use in the invention may contain, if desired, a thermosetting resin as a part of the thermoplastic resin (A) within a range not detracting from the effect of the invention. The thermosetting resin includes, for example, phenol resins, melamine resins, silicone resins, epoxy resins, etc. The amount of the thermosetting resin in the case that contains the thermosetting resin of the type is preferably at most 50% by weight in the thermoplastic resin (A), more preferably at most 30% by weight.

In the invention, a recycled resin may be incorporated in the composition as a part of the thermoplastic resin (A) therein. Not specifically defined, the recycled resin may be any of recycled products in various stages, such as purged resin in molding, matters in sprue or runner, failed products in molding, secondary working or assembly lines, and molded articles used for the intended object and recovered after use. In case where the recycled resin is used, its amount to be added is preferably at most 50% by weight in the total, 100% by weight of the thermoplastic resin (A) and the recycled resin, more preferably at most 30% by weight. When the amount of the recycled resin is at most 50% by weight, then the molded article may have good mechanical strength, dimensional stability and outward appearance. In case where the thermoplastic resin (A) and the recycled resin are mixed and used in molding, it is desirable that they are unified as much as possible in point of their shape and size for the purpose of preventing classification in molding.

EXAMPLES

The invention is described more concretely with reference to the following Examples, in which the material used, its amount and the ratio, the details of the treatment and the treatment process may be suitably modified or changed not overstepping the sprit and the scope of the invention. Accordingly, the invention should not be limited to the scope of the Examples mentioned below.

Example 1

Method for Production of Fiber-Reinforced Polyamide Resin Pellets

Method for Production of Pellets Used in Examples 1-1 to 1-8, Comparative Examples 1-1 to 1-3, 1-6 to 1-9, 1-11, and 1-12

While being opened and drawn, glass fiber rovings were dipped in a melt of a polyamide resin (resin temperature 280° C.), then taken as strands via a die, and cut into long fiber-reinforced polyamide resin composition pellets having a length of 3 mm in Example 1-2, and having a length of 12 mm in the other Examples and Comparative Examples. The ratio of the amount of the glass fiber rovings to the amount of the polyamide resin were controlled to thereby control the content of the reinforcing fibers in the pellets. In Examples and Comparative Examples, the cross-sectional profile of the glass fibers and the type of the polyamide resin are as shown in Tables 1 to 3.

Method for Production of Pellets Used in Comparative Examples 1-4, 1-5, and 1-10

In the blend ratio shown in Tables 1 and 2, those except the glass fiber chopped strands were dry-blended, and then, using a double-screw extruder (Nippon Seikosho's "TEX30XCTt", 9-block barrel constitution), the dry blend except the glass fibers was fed via the hopper and the glass fibers were via the side feeder at the 5th block from the hopper side, and these were melt-kneaded at a resin temperature of 280° C. and a screw rotating speed of 250 rpm, and then cut into pellets having a length of 3 mm, which are for injection-molding.

The polyamide resin composition pellets of Examples and Comparative Examples prepared according to the above-mentioned method were dried at 80° C. for 12 hours, and then molded under the molding condition mentioned below to give molded articles for evaluation test. The obtained molded articles were tested and evaluated according to the condition mentioned below.

[Molding Condition]

An injection-molding machine (Nippon Seikosho's "J150E-P-2M") was used. For the samples of Examples 1-1 to 1-5 and Comparative Examples 1-1 to 1-10 in Tables 1 and 2, a standard-type screw was used, the cylinder temperature was 280° C., the mold temperature was 120° C., the screw rotating speed was 65 rpm. The back pressure was 6.0 MPa in Comparative Example 1-3, and was 0.4 MPa in the others. For the samples of Examples 1-6 to 1-8 and Comparative Examples 1-11 and 1-12 in Table 3, a mild compression-type screw was used, the mold temperature was 120° C., and the cylinder temperature, the back pressure and the screw rotating speed are as in Table 3. Under the condition, ISO test pieces for measurement of mechanical strength, test pieces for measurement of molding shrinkage, test pieces for measurement of warpage, and test pieces for evaluation of surface appearance were produced.

[Method for Determination of the Content of Fibers Having a Fiber Length of at Least 1 mm, and for Determination of the Average Fiber Length]

About 5 g of a sample was cut out of the center of each of the test pieces for bending test, determination of molding shrinkage and determination of warpage, as produced according to the above-mentioned method, ashed in an electric furnace (Toyo Seisakusho's "Electric Muffle Furnace KM-28") at 600° C. for 2 hours, whereby only the thermoplastic resin component was fired away; and then this was spread and dispersed in an aqueous solution of a neutral surfactant by gently picking up with tweezers so as not to break the glass fibers. The aqueous dispersion was transferred onto a slide glass, using tweezers, and its photographic picture was taken via a microscope at a magnification of 20-power and 40-power. Using an image-analyzing software (Planetron's "Image-Pro Plus"), from 1000 to 2000 glass fibers on the photographic image were analyzed, thereby determining the proportion of the fibers having a length of at least 1 mm. In addition, the weight-averaged data of the fiber length was determined as a weight-average fiber length; and the number-averaged data thereof was as a number-average fiber length.

[Method for Determination of Mechanical Strength]

The ISO test pieces produced under the above-mentioned molding condition were tested in an tensile test according to the standard of ISO527, in a bending test according to the standard of ISO178, and in a Charpy impact test (with notch) according to the standard of ISO179. For evaluating the heat resistance thereof, the test pieces were tested in the bending test while heated at 120° C. or lower.

[Method for Determination of Molding Shrinkage]

Under the above-mentioned molding condition, square plates having a length of 100 mm, a width of 100 mm and a thickness of 2 mm were molded in a film-gate mold, and the molding shrinkage thereof was measured in the machine (resin flow) direction (MD) and in the transverse direction (TD). Samples having a low average shrinkage both in MD and TD and having a ratio of shrinkage in MD to that in TD (anisotropy MD/TD) nearer to 1, or that is, having a smaller anisotropy are generally good, as mold planning for them is easy and they may have good dimensional accuracy.

[Method for Determination of Warpage]

Under the above-mentioned molding condition, circular discs having a diameter of 100 mm and a thickness of 1.6 mm were produced (one-point gate on the circumference). One end of the disc was fixed on a flat plate, and the height at the portion most warped up from the plate was measured. This indicates the warpage of the tested sample. Molded articles having a smaller value of the warpage are better, as not warped.

[Method for Evaluation of Surface Appearance]

Under the above-mentioned molding condition, tabular test pieces having a length of 100 mm, a width of 100 mm and a thickness of 2 mm were produced. The surface of each test pieces thus produced was checked visually, and the surface appearance was evaluated from the presence or absence of swelling owing to glass fibers. Samples having no swelling with glass fibers and having extremely excellent surface condition are rated as "⊚"; those within an ordinary acceptable range are as "○"; and those partly having swelling with glass fibers are as "Δ"; and those having swelling with glass fibers in a relatively broad range and are entirely outside the acceptable range are as "x".

[Starting Materials]

(A) Polyamide Resin:

(A-1) MX nylon: Mitsubishi Gas Chemical's "trade name, MX Nylon 6000", relative viscosity (measured in 96% sulfuric acid, concentration 1 g/100 ml, 23° C.) 2.14.

(A-2) Polyamide 6: Mitsubishi Engineering Plastics' "trade name, Novamid® 1007J", relative viscosity (measured in 96% sulfuric acid, concentration 1 g/100 ml, 23° C.) 2.14.

(B) Reinforcing Fibers:

(B-1) Modified cross-section glass fiber rovings: Nittobo's oval (FF) fibers having a major diameter (a) 28 μm and a minor diameter (b)=7 μm, and a degree of flatness of 4.

(B-2) Modified cross-section glass fiber rovings: Nittobo's cocoon-molded (HIS) fibers having a major diameter (a) 20 μm and a minor diameter (b)=10 μm, and a degree of flatness of 2.

(B-3) Circular cross-section glass fiber rovings: Nittobo's circular fibers having a fiber diameter of 13 μm.

(B-4) Modified cross-section glass fiber chopped strands: Nittobo's oval (FF) fibers having a major diameter (a)=28 μm and a minor diameter (b)=7 μm, a degree of flatness of 4, and a fiber length of 3 mm.

(B-5) Circular cross-section glass fiber chopped strands: Nittobo's circular fibers having a fiber diameter of 13 μm, and a fiber length of 3 mm.

TABLE 1

|  |  |  | Example | | Comparative Example | | | | | | |
|---|---|---|---|---|---|---|---|---|---|---|---|
|  |  |  | 1-1 | 1-2 | 1-1 | 1-2 | 1-3 | 1-4 | 1-5 | 1-6 | 1-7 |
| (A-1) | MX nylon | wt. % | 50 | 50 | 50 | 50 | 50 | 50 | 50 | 80 | 80 |
| (A-2) | Polyamide 6 |  |  |  |  |  |  |  |  |  |  |
| (B-1) | Oval glass fiber rovings (degree of flatness 4) |  | 50 | 50 |  |  |  | 50 |  | 20 |  |
| (B-2) | Cocoon-shaped glass fiber rovings (degree of flatness 2) |  |  |  |  | 50 |  |  |  |  |  |
| (B-3) | Circular glass fiber rovings |  |  |  | 50 |  |  |  |  |  | 20 |
| (B-4) | Oval glass fiber chopped strands (degree of flatness 4) |  |  |  |  |  |  |  | 50 |  |  |
| (B-5) | Circular glass fiber chopped strands |  |  |  |  |  |  |  | 50 |  |  |
| Molding Conditon | Cylinder temperature | ° C. | 280 | 280 | 280 | 280 | 280 | 280 | 280 | 280 | 280 |
|  | Mold temperature | ° C. | 120 | 120 | 120 | 120 | 120 | 120 | 120 | 120 | 120 |
|  | Screw rotating speed | rpm | 65 | 65 | 65 | 65 | 65 | 65 | 65 | 65 | 65 |
|  | Back pressure | MPa | 0.4 | 0.4 | 0.4 | 0.4 | 6.0 | 0.4 | 0.4 | 0.4 | 0.4 |
| Mechanical Strength | Proportion of fibers with a length of at least 1 mm in bending test pieces | % | 65 | 56 | 64 | 64 | 22 | 2 | 2 | 65 | 65 |
|  | Weight-average fiber length in bending test pieces | mm | 2.12 | 1.61 | 2.10 | 2.08 | 0.88 | 0.54 | 0.53 | 2.28 | 2.28 |
|  | Number-average fiber length in bending test pieces | mm | 1.77 | 1.34 | 1.75 | 1.73 | 0.73 | 0.45 | 0.44 | 1.90 | 1.90 |
|  | Charpy impact strength (with notch) | kJ/m² | 48.6 | 40.4 | 31.0 | 36.9 | 20.5 | 14.7 | 14.0 | 21.0 | 19.0 |
|  | Flexural strength | MPa | 401 | 398 | 387 | 391 | 395 | 400 | 380 | 250 | 255 |
|  | Flexural modulus | GPa | 18.3 | 18.1 | 19.0 | 18.5 | 18.2 | 19.5 | 19.3 | 7.5 | 7.5 |
|  | 120° C. flexural strength | MPa | 201 | 198 | 171 | 190 | 180 | 169 | 167 | 65 | 68 |
|  | 120° C. flexural modulus | GPa | 9.7 | 9.6 | 9.7 | 9.3 | 9.3 | 8.7 | 8.9 | 4.8 | 5.0 |
| Molding Shrinkage | Proportion of fibers with a length of at least 1 mm in plates | % | 65 | 65 | 63 | 65 | 22 | 2 | 2 | 66 | 67 |
|  | Weight-average fiber length in plates | mm | 2.30 | 2.30 | 2.27 | 2.16 | 0.92 | 0.48 | 0.46 | 2.26 | 2.30 |
|  | Number-average fiber length in plates | mm | 1.92 | 1.92 | 1.89 | 1.80 | 0.77 | 0.40 | 0.38 | 1.88 | 1.92 |
|  | Molding Shrinkage  in MD | % | 0.14 | 0.16 | 0.14 | 0.14 | 0.17 | 0.19 | 0.19 | 0.23 | 0.22 |
|  | in TD | % | 0.27 | 0.29 | 0.44 | 0.35 | 0.44 | 0.44 | 0.46 | 0.42 | 0.45 |
|  | average in MD and in TD | % | 0.21 | 0.23 | 0.29 | 0.25 | 0.31 | 0.32 | 0.33 | 0.33 | 0.34 |
|  | anisotropy MD/TD |  | 0.52 | 0.55 | 0.32 | 0.40 | 0.39 | 0.43 | 0.41 | 0.55 | 0.49 |
| Warpage | Proportion of fibers with a length of at least 1 mm in warp test pieces | % | 63 | 63 | 64 | 64 | 20 | 3 | 3 | 55 | 52 |
|  | Weight-average fiber length in warp test pieces | mm | 2.28 | 2.28 | 2.24 | 2.21 | 0.78 | 0.43 | 0.49 | 2.22 | 2.24 |
|  | Number-average fiber length in warp test pieces | mm | 1.90 | 1.90 | 1.87 | 1.84 | 0.65 | 0.36 | 0.41 | 1.85 | 1.87 |
|  | degree of warpage | mm | 1.0 | 1.2 | 4.7 | 4.2 | 4.0 | 2.6 | 5.0 | 3.0 | 3.6 |
| Appearance | Surface appearance of molded article |  | ◉ | ◉ | X | Δ | ○ | Δ | ○ | ○ | ○ |

TABLE 2

|  |  |  | Example | | | Comparative Example | | |
|---|---|---|---|---|---|---|---|---|
|  |  |  | 1-3 | 1-4 | 1-5 | 1-8 | 1-9 | 1-10 |
| (A-1) | MX nylon | wt. % |  |  | 20 |  |  |  |
| (A-2) | Polyamide 6 |  | 50 | 60 | 30 | 60 | 80 | 80 |
| (B-1) | Oval glass fiber rovings (degree of flatness 4) |  | 50 | 40 | 50 |  | 20 |  |
| (B-2) | Cocoon-shaped glass fiber rovings (degree of flatness 2) |  |  |  |  | 40 |  |  |
| (B-3) | Circular glass fiber rovings |  |  |  |  |  |  |  |

TABLE 2-continued

|  |  |  | Example | | | Comparative Example | | |
| --- | --- | --- | --- | --- | --- | --- | --- | --- |
|  |  |  | 1-3 | 1-4 | 1-5 | 1-8 | 1-9 | 1-10 |
| (B-4) | Oval glass fiber chopped strands (degree of flatness 4) |  |  |  |  |  |  |  |
| (B-5) | Circular glass fiber chopped strands |  |  |  |  |  |  | 20 |
| Molding | Cylinder temperature | ° C. | 280 | 280 | 280 | 280 | 280 | 280 |
| Conditon | Mold temperature | ° C. | 120 | 120 | 120 | 120 | 120 | 120 |
|  | Screw rotating speed | rpm | 65 | 65 | 65 | 65 | 65 | 65 |
|  | Back pressure | MPa | 0.4 | 0.4 | 0.4 | 0.4 | 0.4 | 0.4 |
| Mechanical | Proportion of fibers with a length of at least 1 mm in bending test pieces | % | 60 | 66 | 60 | 65 | 64 | 2 |
| Strength | Weight-average fiber length in bending test pieces | mm | 2.04 | 2.09 | 2.04 | 2.28 | 2.04 | 0.46 |
|  | Number-average fiber length in bending test pieces | mm | 1.70 | 1.74 | 1.70 | 1.90 | 1.70 | 0.38 |
|  | Charpy impact strength (with notch) | kJ/m$^2$ | 45.3 | 40.0 | 41.0 | 19.0 | 18.2 | 17.0 |
|  | Flexural strength | MPa | 385 | 358 | 380 | 255 | 243 | 238 |
|  | Flexural modulus | GPa | 15.6 | 13.2 | 16.5 | 7.5 | 6.9 | 6.9 |
|  | 120° C. flexural strength | MPa | 177 | 162 | 168 | 68 | 55 | 53 |
|  | 120° C. flexural modulus | GPa | 8.1 | 7.9 | 8.5 | 5.0 | 3.9 | 3.9 |
| Molding | Proportion of fibers with a length of at least 1 mm in plates | % | 62 | 67 | 60 | 67 | 66 | 2 |
| Shrinkage | Weight-average fiber length in plates | mm | 2.08 | 2.12 | 2.26 | 2.21 | 2.18 | 0.48 |
|  | Number-average fiber length in plates | mm | 1.73 | 1.77 | 1.88 | 1.84 | 1.82 | 0.40 |
|  | Molding shrinkage in MD | % | 0.18 | 0.19 | 0.15 | 0.22 | 0.24 | 0.25 |
|  | in TD | % | 0.33 | 0.36 | 0.28 | 0.45 | 0.55 | 0.55 |
|  | average in MD and in TD | % | 0.26 | 0.28 | 0.22 | 0.34 | 0.40 | 0.40 |
|  | anisotropy MD/TD |  | 0.55 | 0.53 | 0.54 | 0.49 | 0.44 | 0.45 |
| Warpage | Proportion of fibers with a length of at least 1 mm in warp test pieces | % | 66 | 63 | 59 | 52 | 61 | 2 |
|  | Weight-average fiber length in warp test pieces | mm | 2.09 | 2.06 | 2.24 | 2.10 | 2.14 | 0.50 |
|  | Number-average fiber length in warp test pieces | mm | 1.74 | 1.72 | 1.87 | 1.75 | 1.78 | 0.42 |
|  | degree of warpage | mm | 2.8 | 2.7 | 1.3 | 3.6 | 4.0 | 4.0 |
| Appearance | Surface appearance of molded article |  | ○ | ○ | ◎ | ○ | Δ | Δ |

TABLE 3

|  |  |  | Example | | Comparative Example | Example | Comparative Example |
| --- | --- | --- | --- | --- | --- | --- | --- |
|  |  |  | 1-6 | 1-7 | 1-11 | 1-8 | 1-12 |
| (A-1) | MX nylon | wt. % | 50 | 50 | 50 | 50 | 50 |
| (A-2) | Polyamide 6 |  |  |  |  |  |  |
| (B-1) | Oval glass fiber rovings (degree of flatness 4) |  | 50 | 50 | 50 | 50 | 50 |
| Molding | Cylinder temperature | ° C. | 280 | 280 | 280 | 300 | 280 |
| Conditon | Mold temperature | ° C. | 120 | 120 | 120 | 120 | 120 |
|  | Back pressure | MPa | 0.2 | 0.4 | 6.0 | 0.4 | 0.4 |
|  | Screw rotating speed | rpm | 65 | 65 | 65 | 65 | 120 |
|  | Screw type |  | mild compression | mild compression | mild compression | mild compression | mild compression |
| Mechanical Strength | Proportion of fibers with a length of at least 1 mm in bending test pieces | % | 65 | 60 | 22 | 63 | 25 |
|  | Weight-average fiber length in bending test pieces | mm | 2.40 | 1.98 | 0.88 | 2.12 | 0.74 |
|  | Number-average fiber length in bending test pieces | mm | 2.00 | 1.65 | 0.73 | 1.77 | 0.62 |
|  | Charpy impact strength (with notch) | kJ/m$^2$ | 53.0 | 48.6 | 20.5 | 43.7 | 28.0 |
|  | Flexural strength | MPa | 420 | 410 | 380 | 401 | 383 |
|  | Flexural modulus | GPa | 18.0 | 18.3 | 18.2 | 18.3 | 18.1 |
| Appearance | Surface appearance of molded article |  | ○ | ○ | ○ | ◎ | ○ |

Table 1 shows Examples and Comparative Examples in which MX nylon was used as the polyamide resin. The results confirmed the following:

(1) Comparative Example 1-1 is the same as Examples 1-1 and 1-2 in point of the resin composition; but in the former, circular glass fibers were used as the reinforcing fibers. In this case, even though the average glass fiber length and the proportion of the glass fibers having a length of at least 1 mm in the molded article are both on the same level as in Example 1-1, and even though the average glass fiber length is longer than in Example 1-2 and the proportion of the glass fibers having a length of at least 1 mm is larger than therein, the molded article was inferior to that in Example 1-1 in point of all the mechanical strength, the heat resistance, the molding shrinkage, the warpage resistance and the surface appearance. Even when flattened glass fibers are used as the reinforcing fibers as in Comparative Example 1-2, the molded article could not satisfy the level of the invention in point of the mechanical strength, the heat resistance, the molding shrinkage, the warpage resistance and the surface appearance, in case where the degree of flatness is smaller than the range defined in the invention.

(2) Comparative Example 1-3 is the same as Examples 1-1 and 1-2 in point of the resin composition; but in the former, the average glass fiber length in the molded article is short and the proportion of the glass fibers having a length of at least 1 mm is small. In this case, the Charpy impact strength and the 120° C. flexural strength of the molded article are significantly low, and the article could not reach the level of the invention in point of the molding shrinkage and the warpage resistance.

(3) In Comparative Examples 1-4 and 1-5, chopped strands of glass fibers were incorporated.

In Comparative Example 1-4, used were the same flattened glass fibers as in Examples 1-1 and 1-2; and in Comparative Examples 1-5, used were the same circular glass fibers as in Comparative Example 1-2. In the two, the average fiber length in the molded article is short, and the proportion of the fibers not shorter than 1 mm is small. In these Comparative Examples, in particular, the Charpy impact strength, and the 120° C. flexural strength and modulus of the molded articles greatly lowered, and the molded articles were poor in point of the molding shrinkage, the warpage resistance and the surface appearance.

(4) In Comparative Examples 1-6 and 1-7, the blend ratio of MX nylon to glass fibers is 80/20, and the compositions differ from those in the above (1) to (3). In Comparative Example 1-6, used were flattened glass fibers satisfying the requirement in the invention; and in Comparative Example 1=7, used were circular glass fibers. In case where the amount of the glass fibers was smaller than the range defined in the invention, no difference was confirmed in point of the mechanical strength, the molding shrinkage, the warpage resistance and the surface appearance between the case where flattened glass fibers were used and the case where circular glass fibers were used; and the flattened glass fibers could not exhibit the effect thereof.

Table 2 shows Examples and Comparative Examples in which was used polyamide 6, or a mixture of polyamide 6 and MX nylon as the polyamide resin.

(5) The samples of Examples 1-3 to 1-5 are all excellent in the mechanical strength, the heat resistance, the molding shrinkage resistance, the warpage resistance, and the surface appearance.

(6) In Comparative Example 1-8, used were flattened glass fibers having a degree of flatness of 2, as reinforcing fibers.

In this case, the mechanical strength greatly lowered as compared with that in Example 1-4 where glass fibers having a degree of flatness of 4 were used. In particular, the 120° C. flexural strength and modulus greatly lowered, and the heat resistance was poor.

(7) In Comparative Examples 1-9 and 1-10, the blend ratio of polyamide 6 to glass fibers was 80/20. In Comparative Example 1-9, used were glass fibers having a degree of flatness of 4; and in Comparative Example 1-10, used were circular glass fiber chopped strands. In case where the amount of the glass fibers was smaller than the range defined in the invention, the molded article could not exhibit the effect of the flattened glass fibers as compared with the resin molded article which contains circular fibers and in which the proportion of the fibers having a length of at least 1 mm is 2% and is low. This is the same as in the above-mentioned (4).

In Table 3, the screw type in the injection-molding machine used in Examples in Tables 1 and 2 was changed to a mild compression-type screw, and the influence of the conditions of cylinder temperature, back pressure and screw rotating speed on the test results was confirmed.

(8) From the results in Examples 1-6 and 1-7 and Comparative Example 1-11, it is known that with the increase in the back pressure, the average glass fiber length is shortened and the proportion of the glass fibers having a fiber length of at least 1 mm lowers. As in Comparative Example 1-11, when the back pressure is increased up to 6.0 MPa, then the average glass fiber length and the proportion of the glass fibers having a fiber length of at least 1 mm are both lower than those in the range defined in the invention, and therefore the mechanical strength of the molded articles lowers.

(9) From the results in Example 1-8 and Comparative Example 1-12, it is known that when the screw rotating speed is increased, then the average glass fiber length is shortened and the proportion of the glass fibers having a fiber length of at least 1 mm lowers. As in Comparative Example 1-12, when the screw rotating speed is increased up to 120 rpm, then the average glass fiber length and the proportion of the glass fibers having a fiber length of at least 1 mm are both lower than those in the range defined in the invention, and therefore the mechanical strength of the molded articles lowers.

Example 2

Method for Production of Glass Fiber-Reinforced Polyester Resin Pellets

Method for Production of Pellets Used in Examples 2-1, 2-4 and Comparative Examples 2-4, 2-5

While being opened and drawn, long-continuous flattened glass fiber rovings (B-1) (Nittobo's oval (FF) fibers having a major diameter (a)=28 µm and a minor diameter (b) 7 µm, and having a degree of flatness of 4) were led to pass through a dipping die so that the molten resin fed to the dipping die was infiltrated into the fiber rovings, and then processed according to a pultrusion method of shaping, cooling and cutting them, thereby giving long fiber-reinforced polyester resin pellets having a content of the glass fibers (B-1) of 50% by weight and having a pellet length of 12 mm. As the resin, polybutylene terephthalate resin (A-1) (Mitsubishi Engineering Plastics' "trade name, Novaduran® 5008", having a limiting viscosity of 0.85 dl/g) was melted and used herein. In the obtained pellets, the glass fibers had a diameter of 16 µm and a fiber length of 12 mm, the same as the pellet length, and they were aligned in parallel to the length direction of the pellets.

Method for Production of Pellets Used in Example 2-2

Long fiber-reinforced polyester resin pellets were produced in the same manner as in Example 2-1, for which, however, the ratio of the amount of the flattened glass fiber rovings (B-1) to that of the polybutylene terephthalate resin (A-1) was so controlled that the content of the glass fibers (B-1) in the pellets could be 30% by weight.

Method for Production of Pellets Used in Example 2-3

Long fiber-reinforced polyester resin pellets were produced in the same manner as in Example 2-1, for which, however, the resin component was changed to a mixture of polybutylene terephthalate resin (A-1) and polyethylene terephthalate resin (A-2) (Mitsubishi Chemical's "trade name Novapex® GS385", having a limiting viscosity of 0.65 dl/g). The ratio by weight of the polybutylene terephthalate resin (A-1) to the polyethylene terephthalate resin (A-2) was (A-1)/(A-2)=40/10.

Method for Production of Pellets Used in Example 2-5

Long fiber-reinforced polyester resin pellets were produced in the same manner as in Example 2-1, for which, however, the pellet length was changed to 9 mm.

Method for Production of Pellets Used in Comparative Example 2-1

Long fiber-reinforced polyester resin pellets were produced in the same manner as in Example 2-1, for which, however, the reinforcing fibers were changed to circular glass fiber rovings (B-2) having a circular cross section (Nittobo's circular fibers having a fiber diameter=13 μm).

Method for Production of Pellets Used in Comparative Example 2-2

Polybutylene terephthalate resin (A-1) and flattened glass fiber chopped strands (B-3) (Nittobo's oval fibers (FF), having a major diameter (a)=28 μm and a minor diameter (b)=7 μm, and having a degree of flatness of 4, and a fiber length of 3 mm) were pelletized, using a double-screw extruder (Nippon Seikosho's "TTEX30XCT", 9-block barrel constitution). The resin temperature was 280° C., the screw rotating speed was 250 rpm. The polybutylene terephthalate resin (A-1) was fed through the hopper, and the flattened glass fiber chopped strands (B-3) were via the side feeder at the 5th block from the hopper side, and these were melt-kneaded, and then cut to give fiber-reinforced polyester resin pellets having a length of 3 mm.

Method for Production of Pellets Used in Comparative Example 2-3

Fiber-reinforced polyester resin pellets were produced in the same manner as in Comparative Example 2-2, for which, however, the reinforcing fibers were changed to circular glass fiber rovings (B-4) having a circular cross section (Nittobo's circular fibers having a fiber diameter of 13 μm and a fiber length of 3 mm).

Method for Production of Pellets Used in Comparative Example 2-6

Long fiber-reinforced polyester resin pellets were produced in the same manner as in Example 2-1, for which, however, the ratio of the amount of the flattened glass fiber rovings (B-1) to that of the polybutylene terephthalate resin (A-1) was so controlled that the content of the glass fibers (B-1) in the pellets could be 15% by weight.

Method for Production of Pellets Used in Comparative Example 2-7

Long fiber-reinforced polyester resin pellets were produced in the same manner as in Comparative Example 2-1, for which, however, the ratio of the amount of the circular glass fiber rovings (B-2) to that of the polybutylene terephthalate resin (A-1) was so controlled that the content of the glass fibers (B-1) in the pellets could be 15% by weight.

[Condition for Injection-Molding]

The obtained fiber-reinforced polyester resin pellets were dried at 12° C. for 5 hours. An injection-molding machine (Nippon Seikosho's "J150E-P-2M") was used. For the samples of Example 2-4, an ordinary screw was used. For the samples of the other Examples and Comparative Examples than Example 2-4, a mild compression-type screw was used. The cylinder temperature was 275° C., the mold temperature was 80° C., the screw rotating speed was 80 rpm. The back pressure was 6.0 MPa in Comparative Examples 2-4 and 2-5, and was 0.6 MPa in the other Examples and Comparative Examples. Under the condition, ISO test pieces for measurement of mechanical strength and deflection temperature under load; test pieces having a diameter of 100 mm and a thickness of 1.6 mm for measurement warpage (one-point gate on the circumference); and test pieces having a length of 100 mm, a width of 100 mm and a thickness of 2 mm for evaluation of surface appearance were produced. The test pieces were analyzed for the content of fibers having a fiber length of at least 1 mm, for the weight-average fiber length and for the surface appearance in the same manner as in Example 1 mentioned above; and were analyzed for the mechanical strength, for the deflection temperature under load and for the warpage, according the conditions described below. The results are shown in Tables 4 and 5.

[Method for Determination of Mechanical Strength and Deflection Temperature Under Load]

The ISO test pieces produced under the above-mentioned molding condition were tested in an tensile test according to the standard of ISO527, in a bending test according to the standard of ISO178, and in a Charpy impact test (with notch) according to the standard of ISO179. They were analyzed for the deflection temperature under load (1.80 MPa) according to the standard of ISO75, which indicates the heat resistance of the tested sample.

[Method for Determination of Warpage]

One end of the test piece for determination of warpage, as obtained under the above-mentioned molding condition, was fixed on a precision surface plate (JIS B7513), and visually observed the opposite end thereof curving up from the precision surface plate. The curving height was measured as the warpage of the sample. The samples with no curving and therefore having excellent warpage resistance are rated as "⊚"; those with some curving to a degree of warpage of at most 5 mm and therefore judged to have no problem in practical use are rated as "○"; those with warpage of from more than 5 mm to 10 mm and therefore judged to have some problem in practical use are rated as "Δ"; and those much curving up with warpage of more than 10 mm are rated as "X".

TABLE 4

|  |  | Unit | Example 2-1 | Example 2-2 | Example 2-3 | Example 2-4 | Example 2-5 |
|---|---|---|---|---|---|---|---|
| A-1 | Polybutylene terephthalate (limiting viscosity 0.85 dl/g) | wt. % | 50 | 70 | 40 | 50 | 50 |
| A-2 | Polyethylene terephthalate (limiting viscosity 0.65 dl/g) |  |  |  |  | 10 |  |
| B-1 | Oval glass fiber rovings (degree of flatness 4) |  | 50 | 30 | 50 | 50 | 50 |
| B-2 | Circular glass fiber rovings (degree of flatness 1) |  |  |  |  |  |  |

TABLE 4-continued

|  |  | Unit | Example 2-1 | Example 2-2 | Example 2-3 | Example 2-4 | Example 2-5 |
|---|---|---|---|---|---|---|---|
| B-3 | Oval glass fiber chopped strands (degree of flatness 4) |  |  |  |  |  |  |
| B-4 | Circular glass fiber chopped strands (degree of flatness 1) |  |  |  |  |  |  |
| Molding Condition | Cylinder temperature | °C. | 275 | 275 | 275 | 275 | 275 |
|  | Mold temperature | °C. | 80 | 80 | 80 | 80 | 80 |
|  | Screw rotating speed | rpm | 80 | 80 | 80 | 80 | 80 |
|  | Back pressure | MPa | 0.6 | 0.6 | 0.6 | 0.6 | 0.6 |
|  | Screw type | — | mild compression | mild compression | mild compression | Ordinary screw | mild compression |
| Mechanical Strength | Proportion of fibers having a fiber length of at least 1 mm in tensile test pieces | % | 51 | 56 | 48 | 30 | 40 |
|  | Weight-average fiber length in tensile test pieces | mm | 2.15 | 2.41 | 1.97 | 1.15 | 1.80 |
|  | Tensile modulus | GPa | 18.3 | 11.6 | 17.9 | 17.2 | 18.1 |
|  | Tensile strength | MPa | 198 | 148 | 186 | 165 | 190 |
|  | Flexural modulus | GPa | 15.8 | 9.2 | 15.5 | 15.2 | 15.2 |
|  | Flexural strength | MPa | 373 | 225 | 362 | 320 | 368 |
|  | Charpy impact strength (no notch) | kJ/m$^2$ | 114 | 31 | 95 | 57 | 96 |
| Heat Resistance | Deflection temperature under load | °C. | 218 | 209 | 220 | 214 | 218 |
| Warpage | Proportion of fibers having a fiber length of at least 1 mm in warpage test pieces | % | 50 | 58 | 45 | 31 | 39 |
|  | Weight-average fiber length in warpage test pieces | mm | 2.21 | 2.44 | 2.01 | 1.21 | 1.89 |
|  | Warpage | — | ◎ | ○ | ○ | ○ | ○ |
| Appearance | Surface appearance of molded article | — | ○ | ◎ | ◎ | ○ | ◎ |

TABLE 5

|  |  | Unit | Comparative Example 2-1 | 2-2 | 2-3 | 2-4 | 2-5 | 2-6 | 2-7 |
|---|---|---|---|---|---|---|---|---|---|
| A-1 | Polybutylene terephthalate (limiting viscosity 0.85 dl/g) | wt. % | 50 | 50 | 50 | 50 | 50 | 85 | 85 |
| A-2 | Polyethylene terephthalate (limiting viscosity 0.65 dl/g) |  |  |  |  |  |  |  |  |
| B-1 | Oval glass fiber rovings (degree of flatness 4) |  |  |  |  | 50 | 50 |  | 15 |
| B-2 | Circular glass fiber rovings (degree of flatness 1) |  |  | 50 |  |  |  | 15 |  |
| B-3 | Oval glass fiber chopped strands (degree of flatness 4) |  |  |  | 50 |  |  |  |  |
| B-4 | Circular glass fiber chopped strands (degree of flatness 1) |  |  |  |  | 50 |  |  |  |
| Molding Condition | Cylinder temperature | °C. | 275 | 275 | 275 | 275 | 255 | 275 | 275 |
|  | Mold temperature | °C. | 80 | 80 | 80 | 80 | 80 | 80 | 80 |
|  | Screw rotating speed | rpm | 80 | 80 | 80 | 80 | 160 | 80 | 80 |
|  | Back pressure | MPa | 0.6 | 0.6 | 0.6 | 6.0 | 6.0 | 0.6 | 0.6 |
|  | Screw type | — | mild compression | mild compression | mild compression | mild compression | mild compression | mild compression | mild compression |
| Mechanical Strength | Proportion of fibers having a fiber length of at least 1 mm in tensile test pieces | % | 54 | 2 | 2 | 21 | 11 | 54 | 53 |
|  | Weight-average fiber length in tensile test pieces | mm | 2.65 | 0.30 | 0.26 | 0.76 | 0.35 | 1.75 | 1.90 |
|  | Tensile modulus | GPa | 18.5 | 15.7 | 16.2 | 17.6 | 15.9 | 5.9 | 5.6 |
|  | Tensile strength | MPa | 162 | 150 | 153 | 165 | 156 | 106 | 102 |
|  | Flexural modulus | GPa | 15.9 | 15.3 | 15.1 | 15.4 | 15.8 | 5.9 | 5.5 |
|  | Flexural strength | MPa | 281 | 240 | 247 | 258 | 246 | 149 | 140 |
|  | Charpy impact strength (no notch) | kJ/m$^2$ | 70 | 50 | 59 | 60 | 54 | 27 | 23 |
| Heat Resistance | Deflection temperature under load | °C. | 212 | 215 | 210 | 211 | 211 | 192 | 190 |
| Warpage | Proportion of fibers having a fiber length of at least 1 mm in warpage test pieces | % | 53 | 2 | 2 | 22 | 10 | 45 | 43 |
|  | Weight-average fiber length in warpage test pieces | mm | 2.71 | 0.28 | 0.24 | 0.81 | 0.34 | 1.77 | 1.92 |
|  | Warpage | — | Δ | X | X | Δ | X | X | X |
| Appearance | Surface appearance of molded article | — | X | Δ | Δ | Δ | Δ | ○ | ○ |

The results in Tables 4 and 5 confirm the following:

(1) In Examples 2-1 to 2-5, polybutylene terephthalate resin, or a mixture of polybutylene terephthalate resin and polyethylene terephthalate resin is used as the resin component, and the weight-average fiber length in the molded articles falls within the scope of the invention. It is known that all the molded articles have good mechanical strength, heat resistance, warpage resistance and appearance.

(2) In Example 2-1 and Comparative Example 2-1, the proportion of the glass fibers in the resin pellets is the same; and the cross section of the glass fibers is flattened (Example 2-1) or circular (Comparative Example 2-1). Example 2-1 is compared with Comparative Example 2-1, and it is known that the glass fibers having a flattened cross section used enhance the mechanical strength and the heat resistance of the molded articles, significantly reduce warpage thereof and improve the appearance thereof.

(3) In Example 2-1 and Comparative Example 2-2, flattened cross-section glass fiber rovings (Example 2-1) or chopped strands (Comparative Example 2-2) are used in production of resin pellets. When the glass fiber rovings are used, the fiber length in the resin pellets may be kept long, and therefore, the fiber length in the molded article formed of the resin pellets may be also kept long, and the molded article may have more excellent mechanical strength, heat resistance, warpage resistance and appearance.

In Comparative Examples 2-1 and 2-3, circular cross-section glass fiber rovings (Comparative Example 2-1) or chopped strands (Comparative Example 2-3) are used in production of resin pellets. In Comparative Example 2-3 where the chopped strands are used, the fiber length in the molded article is short, and the molded article obtained could not attain the object of the invention. On the other hand, in Comparative Example 2-1 where the glass fiber rovings are used, the fiber length in the molded article is kept long; however, since the cross section of the glass fibers is circular, the molded article could not attain the object of the invention as having poor warpage resistance and appearance.

(4) In Example 2-1 and Comparative Examples 2-4 and 2-5, the resin pellet composition is the same but the condition in injection-molding differs. These are compared with each other, and it is known that, when the back pressure is reduced, then the glass fibers in the molded article are prevented from being broken and the proportion of the glass fibers having a length of at least 1 mm and the weight-average fiber length can be thereby increased more. It is also known that, in case where the back pressure is high and the glass fibers in the molded article do not satisfy the range defined in the invention, it could not attain the object of the invention.

(5) In Comparative Examples 2-6 and 2-7, the blend ratio of polybutylene terephthalate and glass fibers is 85/15. In Comparative Example 2-6, flattened glass fibers like in the invention are used; and in Comparative Example 2-7, circular glass fibers are used. Even though the weight-average fiber length in the molded article is within the scope of the invention, the mechanical strength, the heat resistance and the warpage resistance of the molded article could not be improved, and in particular, the flattened cross-section glass fibers could not exhibit the effect thereof in both cases where flattened glass fibers or circular glass fibers are used, when the amount of the glass fibers is smaller than the range defined in the invention.

(6) In Examples 2-1 and 2-4, the proportion of the glass fibers in the resin pellets is the same, and the screw type of the molding machine used in injection-molding is a mild compression type (Example 2-1) or an ordinary type (Example 2-4). Regarding the screw type for use in injection-molding, it is known that the mild compression type is better than the ordinary type in that the former may reduce the breakage of glass fibers and may increase the proportion of the fibers having a length of at least 1 mm and the weight-average fiber length, and therefore the molded article obtained may have more excellent mechanical strength, heat resistance and warpage resistance.

In Examples 2-1 and 2-5, the proportion of the glass fibers in the resin pellets is the same, and in the stage of producing the resin pellets for use for injection-molding, the length of the resin pellets is 12 mm (Example 2-1) or 9 mm (Example 2-5). It is known that, when the length of the resin pellets is long, the fiber length of the reinforcing fibers in the pellets may also be long, and in case where the resin pellets are molded into a molded article, the reinforcing fibers in the molded article can also be kept long, and the molded article may have more excellent mechanical strength.

INDUSTRIAL APPLICABILITY

As described in detail hereinabove, the invention enjoys the advantages mentioned below, and its industrial applicability is extremely high.

Specifically, according to the invention, a fiber-reinforced thermoplastic resin molded article can be obtained, which is excellent not only in mechanical strength but also in heat resistance, surface appearance and dimensional accuracy; and therefore, the invention may fully satisfy the requirements for weight reduction, thickness reduction, as well as dimensional accuracy and improved appearance of molded articles, and can be used for broad-range applications such as parts in the field of automobiles, in the field of electric and electronic appliances and in the field of precision machines, etc.

What is claimed is:

1. A fiber-reinforced thermoplastic resin molded article of a thermoplastic resin composition comprising from 70 to 35% by weight of a thermoplastic resin (A), and from 30 to 65% by weight of reinforcing fibers (B) of which the cross section is flattened to have a degree of flatness, as expressed by the formula mentioned below, of at least 2.3, wherein the thermoplastic resin (A) is polyamide resin containing at least 20% by weight of MX nylon or polyester resin, and the weight-average fiber length of the reinforcing fibers in the molded article is at least 1 mm:

Degree of flatness=major diameter of reinforcing fiber ($a$)/minor diameter of reinforcing fiber ($b$).

2. The fiber-reinforced thermoplastic resin molded article of claim 1, wherein the degree of flatness of the reinforcing fibers (B) is from 2.3 to 5.

3. The fiber-reinforced thermoplastic resin molded article of claim 1, wherein the weight-average fiber length is from 1 to 10 mm.

4. The fiber-reinforced thermoplastic resin molded article of claim 1, wherein the proportion of the reinforcing fibers having a fiber length of at least 1 mm in the molded article is at least 30% by weight of all the reinforcing fibers.

5. The fiber-reinforced thermoplastic resin molded article of claim 1, wherein the cross-sectional profile of the reinforcing fibers (B) is oval.

6. The fiber-reinforced thermoplastic resin molded article of claim 1, which contains a polybutylene terephthalate resin and/or a polyethylene terephthalate resin as the polyester resin.

7. The fiber-reinforced thermoplastic resin molded article of claim 1, which contains a polybutylene terephthalate resin having a limiting viscosity, as measured in a 1/1 (by weight) mixed solution of phenol and 1,1,2,2-tetrachloroethane at 30° C., of from 0.3 to 1.2 dl/g, and having a titanium content of at most 80 ppm, as the polyester resin.

8. The fiber-reinforced thermoplastic resin molded article of claim 1, which is produced according to an injection-molding method or an extrusion-molding method using pellets prepared by coating the reinforcing fiber with the thermoplastic resin followed by cutting into pellets having a length of at least 3 mm, and wherein the reinforcing fiber is reinforcing fiber rovings.

9. A method for producing a fiber-reinforced thermoplastic resin molded article of claim 1, which comprises performing injection-molding or extrusion-molding of pellets prepared by coating the reinforcing fiber with the thermoplastic resin followed by cutting into pellets having a length of at least 3 mm, and wherein the reinforcing fiber is reinforcing fiber rovings.

* * * * *